United States Patent
Matonog et al.

(10) Patent No.: US 7,254,956 B2
(45) Date of Patent: Aug. 14, 2007

(54) SELF-CONTAINED REFRIGERATION UNIT

(75) Inventors: Philippe Matonog, St. Didier au mont d'or (FR); Xavier Petit, Baldwinsville, NY (US)

(73) Assignee: Carrier Corporation, Syracuse, NY (US)

( * ) Notice: Subject to any disclaimer, the term of this patent is extended or adjusted under 35 U.S.C. 154(b) by 617 days.

(21) Appl. No.: 10/818,060

(22) Filed: Apr. 5, 2004

(65) Prior Publication Data

US 2004/0187507 A1  Sep. 30, 2004

Related U.S. Application Data

(63) Continuation of application No. 10/021,573, filed on Oct. 30, 2001, now Pat. No. 6,742,343.

(51) Int. Cl.
*B60H 1/32* (2006.01)
(52) U.S. Cl. .................. 62/239; 62/DIG. 16
(58) Field of Classification Search .......... 62/239, 62/244, 298, DIG. 16; 454/136
See application file for complete search history.

(56) References Cited

U.S. PATENT DOCUMENTS

| | | | |
|---|---|---|---|
| 3,712,078 A | 1/1973 | Maynard et al. | |
| 4,193,339 A * | 3/1980 | Giles | 454/136 |
| 4,196,657 A * | 4/1980 | Crongeyer et al. | 454/107 |
| 4,641,502 A * | 2/1987 | Aldrich et al. | 62/244 |
| 4,672,818 A | 6/1987 | Roth | |
| 4,690,040 A | 9/1987 | Barnett | |
| 4,787,210 A | 11/1988 | Brown | |
| 4,995,243 A | 2/1991 | Ward | |
| 5,081,912 A | 1/1992 | Clenet | |
| 5,086,627 A | 2/1992 | Borgen | |
| 5,184,474 A | 2/1993 | Ferdows | |
| 5,222,372 A | 6/1993 | DeRees et al. | |
| 5,284,023 A | 2/1994 | Silva et al. | |
| 5,342,238 A * | 8/1994 | Segerpalm et al. | 454/136 |
| 5,878,592 A * | 3/1999 | Borges et al. | 62/285 |

* cited by examiner

*Primary Examiner*—William E. Tapolcai
(74) *Attorney, Agent, or Firm*—Carlson, Gaskey & Olds

(57) ABSTRACT

A removable self-contained refrigeration unit is mounted within a vehicle, and is removable from a vehicle as a unit. The casing mounts both the evaporator and the condenser, and in one embodiment also mounts the compressor. With the embodiment that mounts the compressor, no refrigerant lines need be found anywhere except on the casing. The casing is removable from the vehicle as a one piece unit merely by connecting or disconnecting electrical connections. In a second embodiment the compressor is mounted remotely from the casing but the evaporator and condenser are still changeable as a one piece unit. In this embodiment a refrigerant connection need also be connected or disconnected to change the unit.

8 Claims, 3 Drawing Sheets

SELF-CONTAINED REFRIGERATION UNIT

This application is a continuation of U.S. Non-Provisional Patent Application Ser. No. 10/021,573, filed on Oct. 30, 2001 now U.S. Pat. No. 6,742,343.

BACKGROUND OF THE INVENTION

This application discloses and claims a self-contained refrigeration unit that is designed to be installed in suitable receiving recesses in a truck or trailer refrigeration body. The refrigeration unit can be mounted entirely with a removable casing such that only electrical connections need be removed or attached to replace the unit, or in one embodiment some minor refrigerant connections may also need to be completed.

So-called refrigeration trucks have a trailer or compartments that are cooled or refrigerated to preserve cargo, such as food stuffs. Typically, the various components of a refrigerant cycle are mounted into the truck separately and apart from each other. As a consequence of this configuration, a significant amount of tubing and electrical wiring is used to control and route the refrigerant between the components of the refrigeration system. This tubing and wiring prevents the easy installation and removal of these components, requiring significant labor and expense to connect and disconnect the components of the refrigeration system for installation or maintenance.

For example, repair of the evaporator requires the disconnection of the evaporator from the truck trailer's refrigeration system and then removal of this particular component. While this component is repaired, the refrigeration system is rendered useless and the truck inoperable for refrigeration during the time of repair.

Also, refrigerated trucks typically have the refrigerant circuit mounted in a box above the nominal top of the vehicle cabin. Space in this area tends to be crowded as a consequence of increased space for the driver.

A need therefore exists for a refrigeration system that can be easily repaired without causing significant downtime in the use of the refrigeration truck.

SUMMARY OF THE INVENTION

The present invention comprises a self-contained refrigeration unit that permits convenient installation and removal of the unit from a vehicle. Like existing refrigeration systems, the refrigeration unit comprises an evaporator, a condenser and a compressor. In contrast to such systems, however, the refrigeration unit localizes these refrigeration components on a casing of a standardized size to support the evaporator, condenser and compressor. This casing is tailored to fit a frame having an opening of about the same standardized size to receive the casing. The frame is part of the vehicle refrigeration compartment. Insulation is also provided between refrigeration components within the unit so as to promote their efficient operation. The entire refrigeration unit may be quickly and easily installed and removed from the vehicle as a modular unit by simply moving the casing in and out of the frame.

In one preferred embodiment, the refrigerant flow of the refrigeration unit is entirely self-contained within the casing. In this configuration, the refrigeration unit may be installed without connecting refrigeration tubing to the unit and may be removed without disconnecting such tubing. To facilitate quick and easy installation and removal, the refrigeration unit also employs a power connector on the casing and a matching power connector about the frame of the vehicle so that the refrigeration unit may be quickly powered by plugging the connectors together. Also, the casing may have a control connector on the casing with a matching control connector on the frame. Thus, the entire refrigeration unit may be conveniently installed and removed on the vehicle without spending significant time making connections to operate the refrigeration unit.

The unit may be placed in the roof of the vehicle compartment. The unit may also be placed on the walls of the compartment. It is also preferable that a seal be employed between the casing and the frame to insulate the vehicle compartment from ambient temperatures. A layer of the installation between the evaporator and condenser is also used.

In a second embodiment, the compressor is powered by a power take off from the vehicle drive. In this embodiment, a simple check valve connection is placed on the casing such that the refrigerant may be routed to and from the compressor. The invention still facilitates the changing of the refrigeration unit should the evaporator or condenser fail.

The modular nature of the refrigeration unit permits a number of units to be installed on a vehicle on one or multiple trailers. Each of these units may be controlled individually or separately by a control unit. A multiplex bus communication system may be employed to control each unit.

The present invention also permits the storing of an inventory of refrigeration units all of about the same standard size. Accordingly, rather than repair a refrigeration unit on the vehicle, the malfunctioning refrigeration unit may be quickly and easily removed and replaced with another standardized refrigeration unit from inventory. The refrigeration unit may then be repaired without causing significant down time to the operation of the vehicle.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows.

DETAILED DESCRIPTION OF THE PREFERRED EMBODIMENTS

Figure 1:
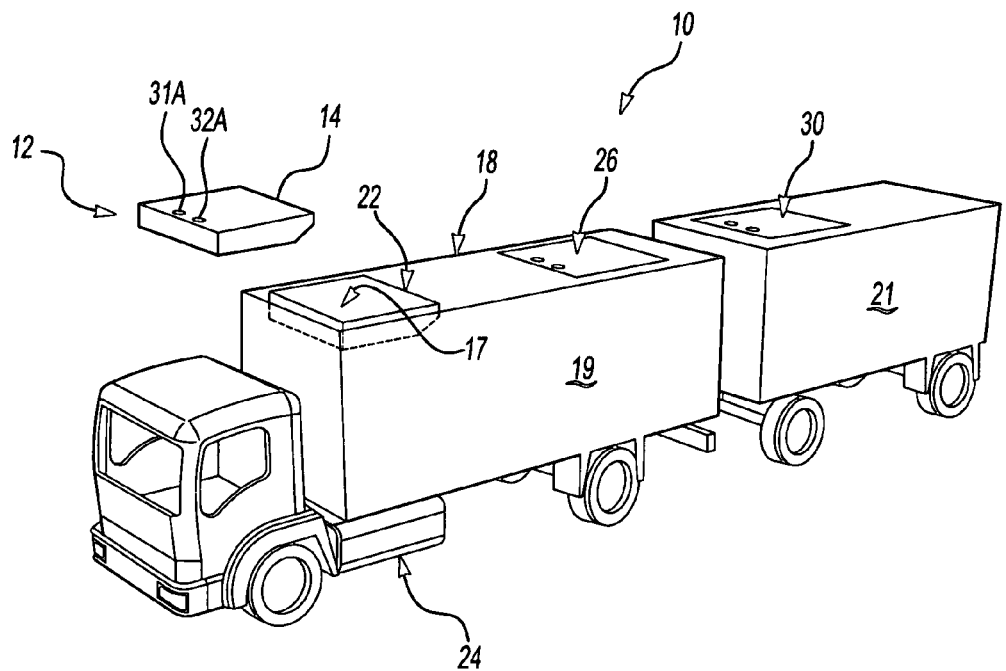
FIG. 1 shows an embodiment of the invention including refrigeration unit with casing and frame having an opening about the size of casing.

FIG. 1 illustrates truck 10 employing the invention. Shown are a self-contained refrigeration unit (SCU) 12 having casing 14 of a predetermined size and frame 22, a casing mounting, on refrigeration compartment 19 having opening 17 of about the same predetermined size of casing 14 so as to receive casing 14. Truck may have another vehicle refrigeration compartment 21 as well as additional refrigeration units 26 and 30. Preferably, refrigeration units 12, 26, and 30 have the approximate same predetermined size to permit their modular interchangeability and to reduce the required inventory or supply of spare refrigeration units.

Because refrigeration unit 12 has casing 14 of approximately the same predetermined size as opening 17 of frame 22, refrigeration unit 12 may be quickly and easily installed and removed onto vehicle refrigeration compartment 19. Moreover, refrigeration unit 12 may be easily replaced by another refrigeration unit from an inventory so that the truck may continue to operate while refrigeration unit 12 is repaired.

Figure 2:
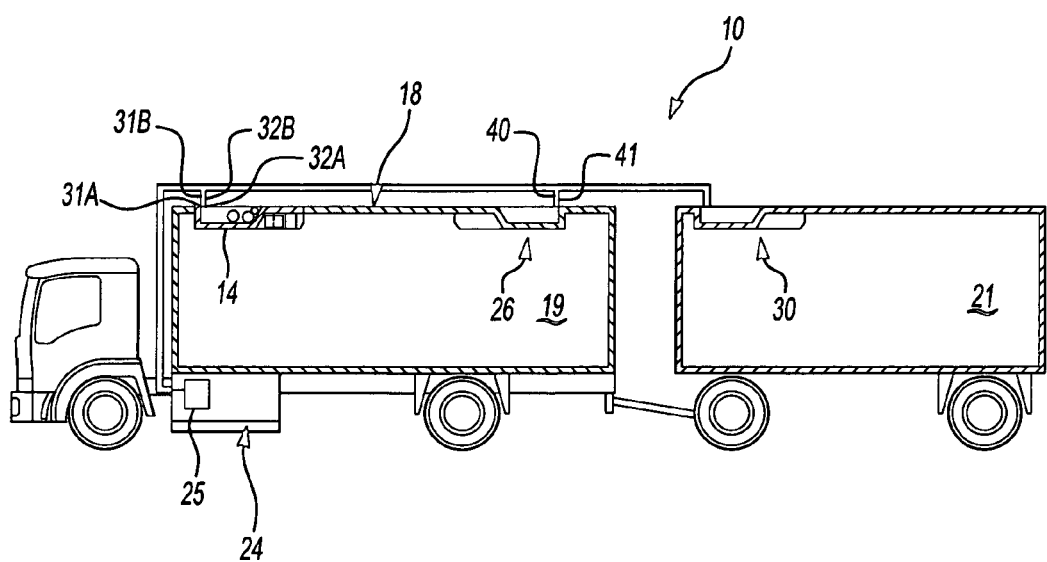
FIG. 2 illustrates a side view of the embodiment of FIG. 1 including a control unit and power unit.

To promote the quick and easy installation of refrigeration unit 12, 26, and 30, the only connections that the invention requires to be made to operate the refrigeration units are electrical connections as can be understood from FIG. 2. Accordingly, refrigeration unit has first power connector 31A on casing 14 that connects to second power connector 31B and has first control connector 32A on casing 14 that connects to second control connector 32B. The connection of first power connector 31A to second power connector 31B powers refrigeration unit 12. As described in greater detail below, such power may be provided by a drive unit 24, an electrical generator on truck 10, fuel cell, or other power source as known. In other words, each refrigeration unit 12, 26, and 30 comprises a complete refrigeration system that only requires a suitable source of electrical power to operate. The connections are shown somewhat schematically here, but a worker in this art would be capable of providing appropriate connections.

Figure 3:
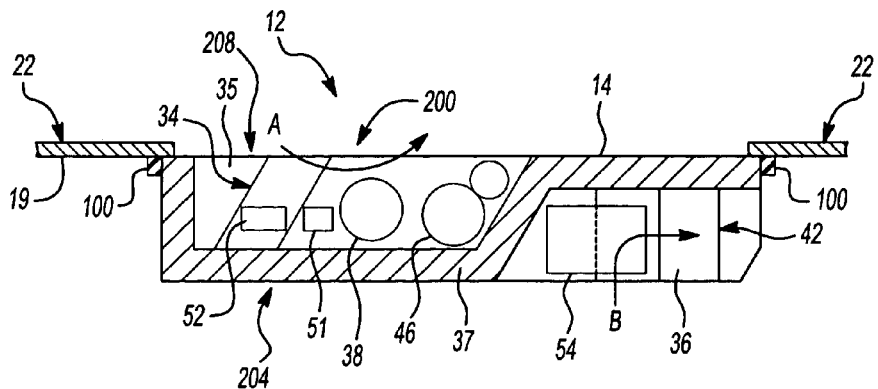
FIG. 3 illustrates a cross-sectional view of the refrigeration unit of FIG. 1 and FIG. 2.

FIG. 3 shows refrigeration unit 12 having electric power control 52 to control electrical power to electrical elements, such as evaporator fan 54, condenser fan 38, compressor 46 and control unit 51. Electric power control 52 may be a set of contractors and thermal relays or can be an electronic inverter to permit speed control of electrical motors.

Figure 3A:
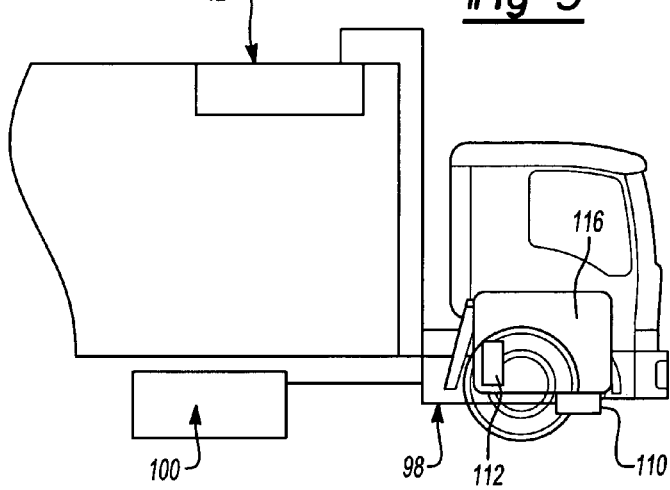
FIG. 3A illustrates various power sources for the refrigeration unit.
Figure 3B:
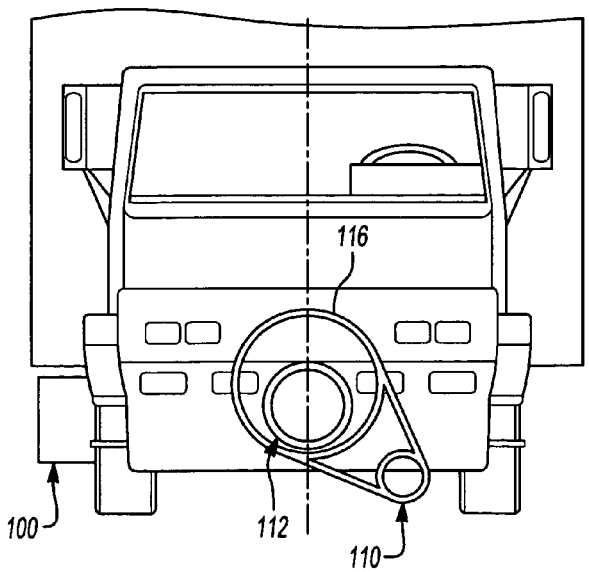
FIG. 3B illustrates a front view of the power sources of FIG. 3A.

As shown in FIGS. 3A and 3B, power to electric power control 52 and other electric components of refrigeration unit 12 may be supplied by electric power supply system 98. Generator 110 mechanically linked to truck engine 116 may provide electrical power as known. Alternatively, power can be provided by connections to generator 112 associated with alternator-starter on a truck engine, which is also commercially available. Additionally, power may be supplied by power module 100, such as a hydrogen fuel cell or genset module, which provides power independently of the operation of truck engine 116. Moreover, as shown below, power may be supplied by a direct drive unit.

The connection of first control connector 32A to second control connector 32B permits refrigeration unit 12 to be controlled by the control unit 25. Each of these refrigeration units 12, 26, and 30 may also be controlled by the same control unit 25. In such a network configuration, each unit may also be powered by the same source of power. Moreover, these units may be powered and operated by known multiplex bus communication systems.

Figure 4:
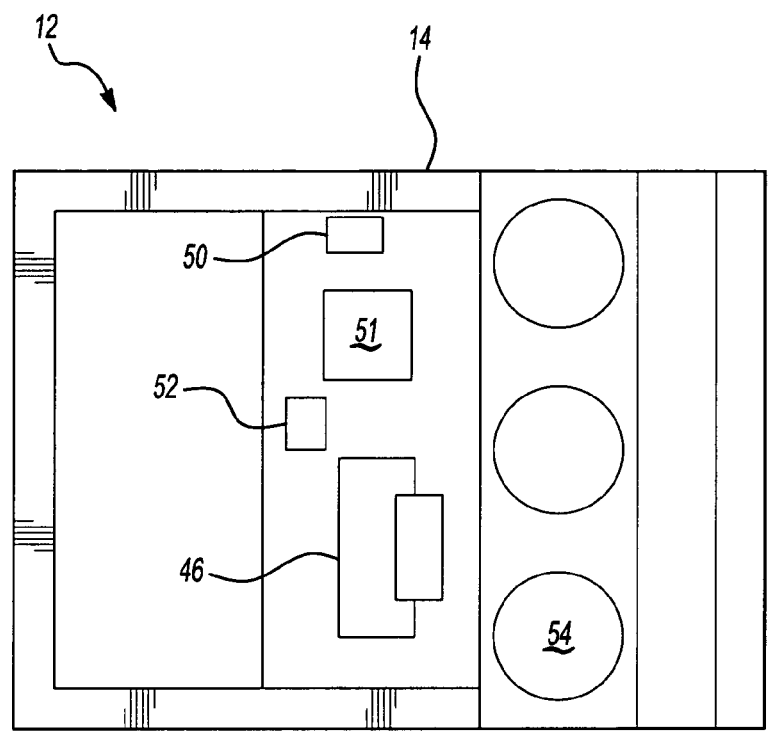
FIG. 4 illustrates a plan view of the refrigeration unit of FIG. 3.

As shown in FIG. 4, each refrigeration unit 12 may also have its own control unit 51, which may work in conjunction with control unit 25 or, independently, to control temperature within each compartment. Hence, refrigeration unit 12 may be linked on a network of refrigeration units or operate on its own. The network link may be through remote control or by bus as known. Thus, refrigeration unit 12 may work independently or in combination with other similarly linked units to control refrigeration. As a consequence, the effect of the failure of one such unit is greatly limited. Moreover, the separate control of each unit also permits the separate control of the temperature of each compartment.

FIG. 3 illustrates the self-contained nature of refrigeration unit 12. As shown in FIGS. 3 and 4, only electrical connections need be made because refrigeration unit 12 is a self-contained refrigeration unit that circulates refrigerant within casing 14. Accordingly, there is no need to connect refrigerant tubing to refrigeration unit 12. The refrigerant is preferably entirely contained within casing. Casing 14 has top 200 spaced from bottom 204. As shown, bottom 204 is disposed in vehicle compartment 19. Casing 14 supports evaporator 42 and compressor 46. Casing 14 may also support condenser fan 38, control unit 51, condenser 34, evaporator fan 54, and other refrigeration components. As known, compressor 46 compresses a refrigerant and communicates this refrigerant to condenser 34. Condenser fan 38 draws outside air through vent 208 in top 200 over condenser 34 so as to remove heat from the refrigerant as shown at A. Refrigerant is then passed through an expansion valve, and then communicated to evaporator 42. Air is drawn over evaporator 42 by fan 54 to cool vehicle refrigeration compartment 19. In contrast to existing systems, refrigeration unit 12 contains all of the necessary elements for refrigeration in casing 14 of a predetermined size that matches opening 17 of frame 22. Refrigerant is substantially communicated within the boundaries of casing 14 as well so that no refrigerant tubing need be connected to refrigeration unit 12 for operation.

As seen in FIG. 3, casing 14 is set into frame 22 of refrigeration compartment 19. Seal 100, preferably a multilip gasket, is placed around casing 14 to allow good insulation and quick installation and removal. This type of seal is typically used on a truck refrigeration door and may be employed here. Casing 14 and seal 100 may be supported within frame 22 through support connections as known. Casing 14 is sufficient to support the weight of components and constructed so as to allow quick installation and removal of casing 14 in less than five minutes. Casing 14 is preferably a roof top unit that does not protrude above frame 22 so as to minimize air drag. The unit may also be placed on the walls of the truck trailer.

To accomplish this goal, as shown in FIG. 3, casing 14 may have two compartments, compartment 35 and compartment 36, separated by wall 37, which is preferably temperature insulated. Compartment 35 has condenser 34, condenser fan 38, while compartment 36 has evaporator 42 and evaporator fan 54. Compressor 46 may occupy space within wall 37 and may be horizontal to reduce the profile of casing 14. Compartment 35 and compartment 36 are located virtually side-by-side to minimize the profile of casing 14 as well.

Moreover, because refrigeration unit 12 is self-contained, a plurality of such units may be easily installed on vehicle refrigeration compartments 19 and 21 without the need to connect refrigeration tubing between the units. Indeed, only power connections and control connections are required.

Figure 5:
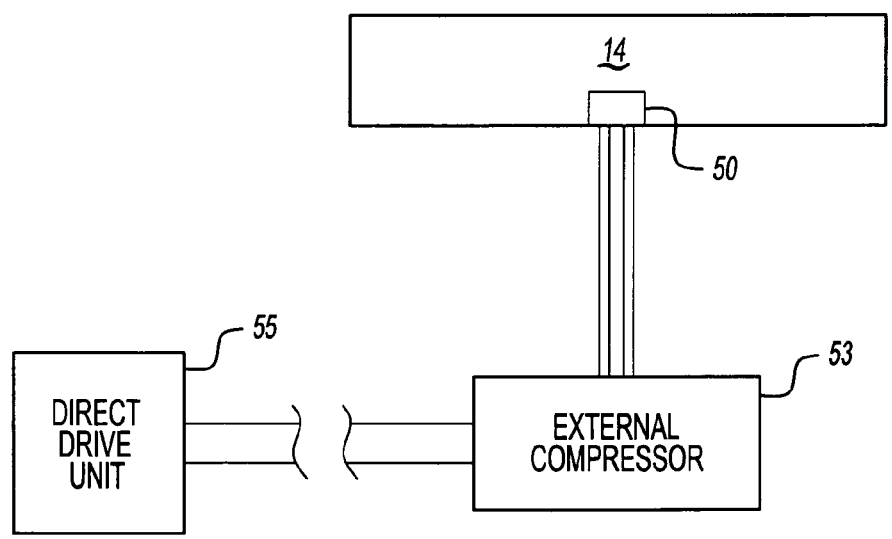
FIG. 5 shows another embodiment of the invention, employing a direct drive unit.

FIG. 5 shows the unit 14 having a refrigerant connection 15 for routing refrigerant to and from an external compressor 53. In this instance, the external compressor 53 is powered by a direct drive unit 55, such as a power takeoff from the vehicle, although the unit may be used as described above in a trailer and truck body. As is known, the compressor draws the most power requirements for a refrigerant cycle, and it may well be that in certain applications it would be desirable to have the compressor driven by the vehicle power takeoff, rather than separately powered from the vehicle power supply. Even so, by having the remainder of the refrigerant cycle mounted on the removable casing 14, the present invention still facilitates the changing of the refrigerants unit. Only the simple electrical connections of the previous embodiment, plus the one simple refrigerant connection 50, need be utilized. Preferably the refrigerant connection 50 would be provided with appropriate check valves on both sides such that any refrigerant in the casing and any refrigerant in the compressor at the time of change will not leak.

The self-contained nature of refrigeration unit 12 as well as its standard size allow for the storing of multiple refrigeration units in an inventory. In this way, each refrigeration unit, such as refrigeration unit 12, refrigeration unit 26, and refrigeration unit 30 may be replaced by another refrigeration unit from inventory merely by disconnecting these units from their respective power and control connectors and removing the units from their locations. The FIG. 5 embodiment would also include the simple refrigerant connection 50 to be changed. Thus, a new unit may be installed simply by placing the refrigeration unit within opening such as opening 17 and making the necessary electrical connections to power and control the unit and perhaps a minor refrigerant connection in the FIG. 5 embodiment. This unit thus minimizes down time of vehicle 10. Moreover, multiple self-contained refrigeration units simplifies multi-temperature and separate control of each refrigeration compartment because each compartment has its own unit with its own compressor that independently cools each compartment. Also, multiple compressors permits one at a time powering of each compressor, reducing the voltage drop and current rush experienced by the truck.

The electrical connections can be provided on a network including both a power and control line. The electrical power system could be a set of contactors and thermal relays or could be an electronic inverter to allow all of the actuators to have speed control. The invention also facilitates the use of multi-temperature applications across several compartments. Achieving a multi-temperature application is made easier by this invention since each compartment may be individually controlled by its own refrigeration unit. Further, by having the several distinct compressors, a power generator for the system can be relieved since the compressors could be started one at a time, and therefore the electrical starting power necessary could be decreased.

The evaporator fan can be any type of axial or centrifugal fan. The fan can be mounted as shown schematically in the figures, or could be mounted transverse. The compressor may be any type of compressor, although it is preferred it be a horizontal compressor. The horizontal compressor serves to minimize the height of the refrigeration unit. More preferably a rotary compressor, and even more preferably a scroll compressor is utilized. Horizontal rotary or scroll type compressors generally have a smaller size, weight, and relative cost then other compressors.

The aforementioned description is exemplary rather that limiting. Many modifications and variations of the present invention are possible in light of the above teachings. The preferred embodiments of this invention have been disclosed. However, one of ordinary skill in the art would recognize that certain modifications would come within the scope of this invention. Hence, within the scope of the appended claims, the invention may be practiced otherwise than as specifically described. For this reason the following claims should be studied to determine the true scope and content of this invention.

What is claimed is:

1. A refrigeration system comprising:
    at least one refrigeration unit comprising,
        an evaporator;
        a condenser communicating a refrigerant to said evaporator;
        a compressor communicating said refrigerant to said condenser;
        a casing of a predetermined size supporting at least said evaporator and said condenser;
        a frame on a vehicle refrigeration compartment, having an opening of about said predetermined size to receive said casing wherein said refrigerant is substantially communicated within said casing; and
        said casing being removable as a unit with said condenser and said evaporator.

2. The refrigeration system of claim 1 including a seal between said casing and said frame of said at least one refrigeration unit.

3. The refrigeration system of claim 1 wherein said opening is on a roof of said vehicle compartment.

4. The refrigeration system of claim 1 wherein said casing also supports said compressor.

5. The refrigeration system of claim 1 wherein said compressor is mounted remotely from said casing, and a refrigerant connector is provided with said casing to communicate with said compressor.

6. The refrigeration system of claim 1 wherein said casing has a top spaced above a bottom, said bottom disposed in said vehicle compartment and said top having a vent for communicating air through said casing.

7. The refrigeration system of claim 6 wherein said vent is arranged to communicate air to said condenser.

8. The refrigeration system of claim 7 including a fan for drawing air through said vent to said condenser.

* * * * *